Aug. 9, 1966   A. BRUEDER   3,264,946
SERVO STEERING OF VEHICLES
Filed Dec. 16, 1963
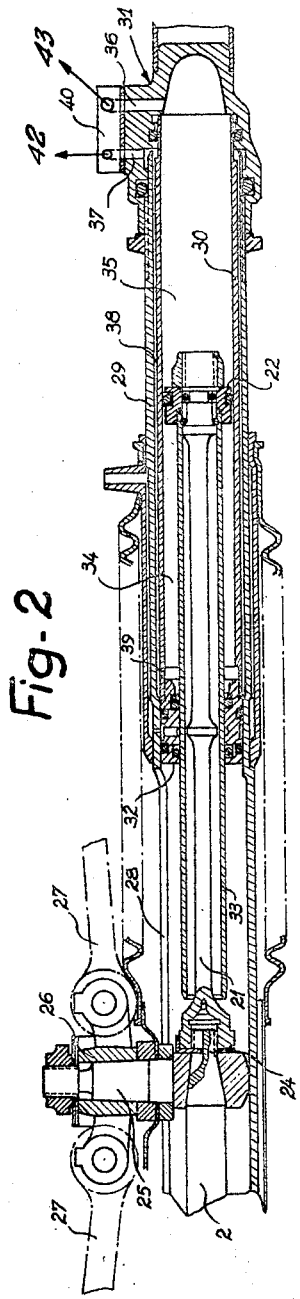
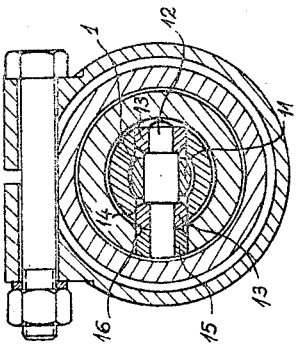
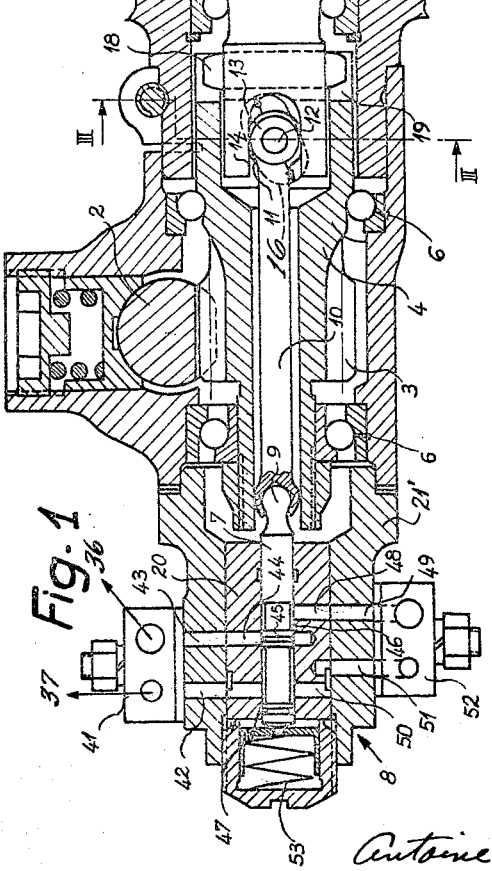

3,264,946
SERVO STEERING OF VEHICLES
Antoine Brueder, Paris, France, assignor to Societe Anonyme Andre Citroen, Paris, France, a corporation of France
Filed Dec. 16, 1963, Ser. No. 330,976
Claims priority, application France, Jan. 10, 1963, 921,015, Patent 1,364,591
4 Claims. (Cl. 91—382)

This invention relates to servo-action steering controls of automotive vehicles, of the type comprising a fluid actuated servo cylinder having a piston provided on one side only with a rod adapted to actuate the steering linkage, and a distributor for delivering fluid under pressure to said cylinder which is responsive to the manual steering control having a certain control backlash adapted to actuate the distributor as a function of the direction in which the steering wheel is turned.

This invention is concerned more particularly with a servo steering of this general type which is remarkable through the manner in which the servo-action force is distributed, and notably through the operation of the distributor which leads to a particularly simple construction operating in a very satisfactory and reliable manner.

According to a primary feature of this invention, the distributor is so designed as to constantly connect the source of fluid under pressure to the cylinder chamber consisting of the annular space surrounding the piston rod, said distributor being also adapted to connect the other chamber of said cylinder either with the source of pressure or with the exhaust, according to the direction of actuation of said manual steering control.

Other features and advantages of this invention will appear as the following description proceeds with reference to the accompanying drawing illustrating diagrammatically by way of example a typical form of embodiment of a servo steering according to this invention. In the drawing:

FIGURE 1 is an axial longitudinal section showing the steering box incorporating the fluid-pressure distributor and the control means thereof;

FIGURE 2 is an axial section showing the servo-action cylinder connected to the steering linkage and FIGURE 3 is a cross-section taken upon the line III—III of FIG. 1.

The steering mechanism illustrated comprises a steering shaft 1 adapted to be rotated by means of a steering wheel (not shown).

This shaft 1 is used in this example for controlling a pinion-and-rack steering, the rack 2 being in constant meshing engagement with a pinion 3 solid with a shaft 4 constituting the extension of shaft 1. These shafts 1 and 4, mounted for rotation but held against axial movement in bearings 5, 6 fitted in the steering housing, are partly coaxial and rotatably coupled with a certain relative angular play, as will be explained presently, so that any relative rotation of these shafts will cause the positive displacement of a slide valve or like member 7 of a fluid-pressure distributor designated generally by the reference numeral 8 and disposed in axial alignment with the shaft 4.

This slide valve 7 is connected through a ball-and-socket joint 9 to a rod 10 extending through an axial cavity of shaft 4 and having at its opposite end an enlarged portion or boss 11 centered in a corresponding recess of shaft 1; this boss 11 carries a pin 12 extending at right angles to the axis of shafts 1 and 4. This pin 12 carries in turn a pair of rollers 13 disposed on either side of the boss 11 in axial guideways 14 formed in the shaft 1. On one side of these rollers the pin 12 carries another roller 15 engaging a helical groove 16 also formed in the shaft 4; as a consequence of this crossed disposal of guideways 14 and 16 it is clear that any relative rotation of shafts 1 and 4 involves an axial displacement of slide valve 7 which is connected to that of rod 10.

With this arrangement, a single guideway on shaft 4 is sufficient to provide without difficulty and with the desired precision a control connection without play between the set of rollers and the shafts 1 and 4, as contrasted with hitherto known multiple-guideway control systems of this general character.

The axial movement of slide valve 7 and therefore the maximum steering control play may be limited to the desired value by properly selecting the permissible movement of roller 15 along the guideway 16.

The control play is subordinate in this example to the relative dimensions of a drive pin 18 fitted radially across the shaft 1 and of a pair of notches 19 formed in the axial direction in the end portion of shaft 4 receiving the shaft 1.

The slide valve 7 is slidably fitted in a sleeve member 20 secured in a fixed position in the distributor body 21' assembled with the steering housing.

On the other hand, as shown in FIG. 2, the rack 2 has one end connected to the rod 21 of piston 22 of the servo-action cylinder adapted to be mounted in a fixed position on the vehicle. The piston rod 21 is connected by screwing at 24 to the rack 2, this assembly also serving the purpose of mounting by cone-fitting, on said rack, a drive pin 25 carrying a member 26 for interconnecting the drag links shown diagrammatically at 27. The drive pin 25 is guided in a longitudinal slot 28 formed along a tubular casing 29. Within this tubular casing another tubular member 30 is mounted to constitute the servo-action cylinder, each tubular member 29, 30 being fitted in a fluid-tight manner at one of their ends in a cap member 31 secured by screwing on the outer tubular member 29. At its opposite end the cylinder-forming tube 30 is assembled with a cylinder bottom 32 fitted in a fluid-tight manner in the tubular member 30, this cylinder bottom 32 having slidably fitted therein another fluid-tight tube 33 surrounding the piston rod 21 of the servo-action cylinder, and being assembled with this rod as well as with the piston 22 in a fluid-tight manner, by means of a common mounting. This tube 33 provides within the cylinder 30, between the piston and the cylinder bottom 32, an annular chamber 34 having approximately half the cross-sectional area of the other chamber 35 of the cylinder.

The cap member 31 is formed with a passage 36 communicating directly with the chamber 35 and another passage 37 communicating permanently with the chamber 34 through the annular space 38 formed between the tubes 29 and 30, a complementary radial passage 39 is formed in the tubular member 30 in the vicinity of its connection with the cylinder bottom 32.

The passages 36 and 37 are connected through a connector 40 secured on the cap member 31 and by means of pipes (not shown) to another connector 41 secured on the distributor body 21', these connections being such that the annular chamber 34 of the fluid-actuated cylinder communicates with the passage 42 of the distributor and the chamber 35 with the passage 43 thereof.

This passage 43 communicates in turn with another passage 44 formed in the sleeve 20 and, in the intermediate position of slide valve 7, as shown in the drawing, the passage 44 is closed by a solid portion 45 of the slide valve to isolate the chamber 35.

On either side of this solid portion 45 the slide valve is formed with a pair of grooves 46, 47. The groove 46 communicates permanently with a passage 48 formed in the sleeve which communicates in turn with a passage 49 of the distributor acting as an exhaust port. The other groove 47 communicates permanently with a passage 50 formed through the sleeve. This last-named pasage communicating on the one hand with another passage 51 formed through the wall of the distributor body which is connected through a connector 52 to a source of fluid under pressure (not shown), and on the other hand to a passage 42 communicating with the annular chamber 34 of the cylinder. Moreover, the slide valve 7 is responsive, at its end opposite to its control rod 10, to the action of a spring-loaded push member 53 constantly tending to take up in the same direction any play likely to develop in the slide-valve control proper.

This servo steering operates as follows:

In the distributor 8, the slide valve 7—irrespective of its controlled axial position—constantly connects the source of fluid under pressure with the annular chamber 34 of the cylinder, as just set forth hereinabove.

In the intermediate position of the slide valve as shown in the drawing which corresponds to the mean angular position of shaft 1 with respect to shaft 4 wherein the road wheel steering is that requested through the steering wheel, the slide valve 7 closes with its solid portion 45 the passage 44 connected to the second chamber 35 of the cylinder, whereby the fluid pressure prevailing in this chamber will normally assume a value which is one fraction of the fluid pressure from the source connected to the other chamber 34 and depending on the ratio of the active cross-sectional areas of the piston 22 in chambers 34 and 35 respectively. Under these conditions, the movement of slide valve 7 in one or the other direction, according to the direction in which the steering wheel and therefore the shaft 1 are rotated, will adjust the value of the fractional pressure prevailing in chamber 35. Thus, when the slide valve is moved in the direction to cause the passage 44 to communicate with the groove 47, the fractional value of the pressure prevailing in chamber 35 increases and its action becomes preponderant with respect to that of the pressure produced in chamber 34, and therefore the piston 22 is moved to the lift as seen in FIGURE 2. The fluid flowing from chamber 34 is thus forced through the groove 47 of slide valve 7 into chamber 35, this flow lasting as long as slide valve 7 is kept in this position as a consequence of the action exerted by the driver on the steering wheel. It is seen that the usual follow-up action is here obtained through the intermediary of the rack moved by the piston 22 and which therefore drives, at the same time as the wheels of the vehicle in steering, the shaft 4 in relative rotation with relation to the shaft 1 in the direction to lead back with the axis 12, by the cooperation of the helical groove 16 and the roller 15 and displacing axially the paired rollers 13 in the guideways 14, the rod 10 into its median position at which the solid portion 45 of the slide valve 7 assumes finally the closing position for the conduit 44 when it reaches the steering angle of the wheels desired by the operator. When on the other hand the slide valve is moved in the direction to cause the passage 44 to communicate with the exhaust groove 46, the fractional value of the pressure produced in chamber 35 decreases and the action exerted by the pressure prevailing in chamber 34 become preponderant in turn, thus causing the piston 22 to move to the right as seen in FIGURE 2. This action lasts as long as slide valve 7 is kept in this new position by the action exerted by the driver on the steering wheel.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. Servo steering mechanism of a vehicle, comprising a manual steering control, a steering linkage, a cylinder, a piston in said cylinder dividing said cylinder into a first chamber and a second chamber, a rod connected to said piston extending through said first chamber to actuate said steering linkage, a source of fluid under pressure, a pressure-fluid distributor having a movable member for delivering said fluid to said chambers responsive to said manual steering control having a certain control backlash to operate said movable member of said distributor, said distributor constantly connecting said first chamber with said source of fluid, and connecting said second chamber according to the direction of actuation of said manual control, either with said source of fluid under pressure, or with an exhaust, a first passage connecting said first chamber and said distributor, a second passage connecting said second chamber and said distributor, said movable member of said distributor comprising a slide valve having a portion to close said second passage, a groove in said slide valve on one side of said portion interconnecting said source of fluid under pressure to said first chamber and a second groove at the other side of said portion communicating with an exhaust passage.

2. Servo steering mechanism according to claim 1 wherein said movable member of said distributor is controlled from two partially coaxial shafts of said manual control.

3. Servo steering mechanism as set forth in claim 2 wherein a pin is disposed across the axis of said shafts engaging the intersection of crossed guideways formed in said shafts.

4. Servo steering mechanism as set forth in claim 3 wherein at least one of said shafts comprises a single cam face for guiding said pin.

References Cited by the Examiner

UNITED STATES PATENTS

| 715,136 | 12/1902 | Patterson | 137—625.69 |
| 2,826,258 | 3/1958 | Livers | 91—382 |
| 2,936,739 | 5/1960 | Levensteins et al. | 91—416 |
| 2,964,017 | 12/1960 | Hruska | 91—368 |

MARTIN P. SCHWADRON, *Primary Examiner.*

FRED E. ENGELTHALER, SAMUEL LEVINE,
*Examiners.*

P. E. MASLOUSKY, *Assistant Examiner.*